Nov. 7, 1933.  W. RAVER  1,934,559
BATTERY TERMINAL
Filed Sept. 19, 1932
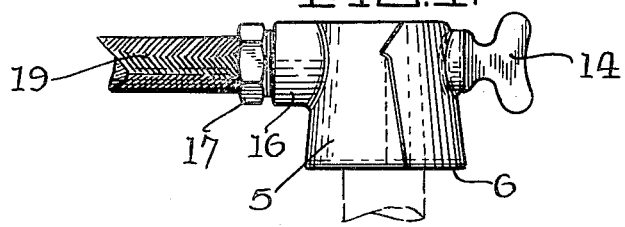
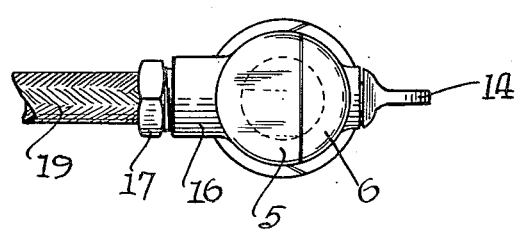
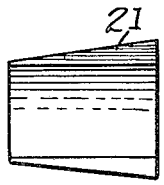
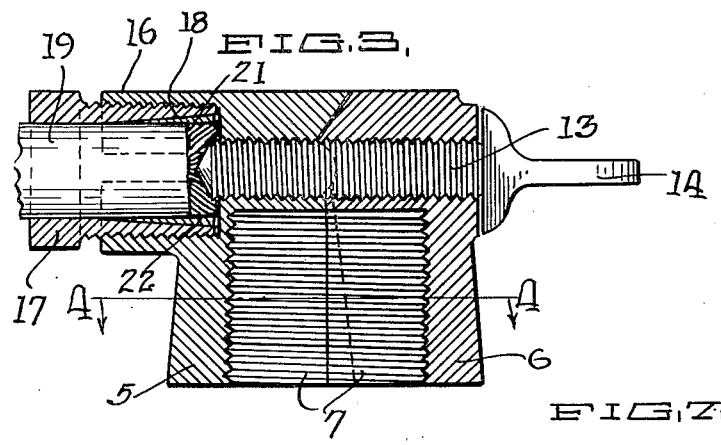
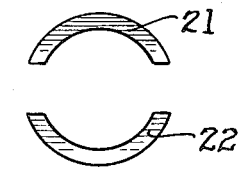
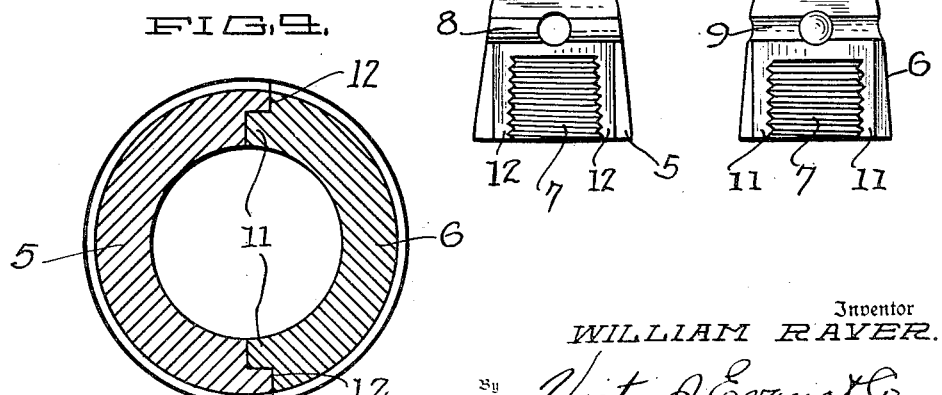
Inventor
WILLIAM RAVER.
By Victor J. Evans & Co
Attorney Patented Nov. 7, 1933

1,934,559

UNITED STATES PATENT OFFICE 1,934,559

BATTERY TERMINAL

William Raver, Sacramento, Calif., assignor to John B. Matthew, Sacramento, Calif.

Application September 19, 1932
Serial No. 633,883

1 Claim. (Cl. 173—259)

This invention relates to improvements in battery terminals.

The principal object of the invention is to provide a non-corrosive device adapted to secure an electric cable to a battery lug.

A further object is to provide means whereby the terminal may be quickly placed or removed from the battery lug.

A further object is to provide means whereby the battery cable may be effectively electrically connected to the lug.

A still further object is to produce a device which is economical to manufacture.

Other objects and advantages will be apparent during the course of the following description.

In the accompanying drawing forming a part of this specification and in which like numerals are employed to designate like parts throughout the same, Fig. 1 is a side elevation of my device, Fig. 2 is a top plan view of Fig. 1, Fig. 3 is an enlarged detail cross sectional view, Fig. 4 is a cross sectional view on the line 4—4 of Fig. 3, Fig. 5 is a side elevation of one of the cable gripping wedges, Fig. 6 is an end elevation of two of the gripping wedges, and Figs. 7 and 8 are side elevations of the two battery lug engaging members.

A great deal of difficulty is experienced in connecting electrical cables to batteries for the reason that corrosion takes place, the result being that there is a poor electrical connection between the cable and the batteries. Applicant has devised a connector wherein this difficulty is eliminated.

In the accompanying drawing wherein for the purpose of illustration is shown a preferred embodiment of my invention, the numerals 5 and 6 designate castings preferably made of a lead composition which are both threaded as shown at 7, which threads when in proper alignment correspond to the threads of the battery lug, or if the lug is not provided with threads these threads serve to bite into the lug and thus effect a perfect electrical connection.

These two castings 5 and 6 are peculiarly formed so that they interlock and by referring to Figs. 7 and 8 it will be noted that a projection 8 is formed upon one casting and a recess 9 is formed upon the other casting. Also by referring to Fig. 4 it will be noted that lips 11 are formed upon the casting 6 which fit into recesses 12 formed upon the casting 5. A threaded element 13 having a thumb piece 14 serves to connect the two portions of the castings 5 and 6 whereby they may be drawn into intimate engagement with the battery lug. An offset 16 is threaded so as to receive a bushing 17 having a tapered bore 18. This permits the end 19 of a cable to be inserted in the bushing and to be engaged by a pair of wedges 21 and 22, the result being that when the bushing 19 is screwed home, the tapered bore serves to compress the wedges 21 and 22 into intimate engagement with the end of the cable 19. The screw 13 has a tapered end which is in alignment with the end of the cable 19, the result being that when the screw is tightened as shown in Fig. 3, the end of the screw tends to spread the ends of the strands of the cable which further locks the cable to the device.

The result of this construction is that when the cable has been attached to the casting 5 and the casting 6 secured to the casting 5, but in spaced relation thereto, the terminal as a whole may be placed over a battery lug and the threaded element 13 rotated so as to move the casting 6 towards the casting 5 and to thus engage the battery lug, thus making an efficient electrical connection between the cable and the battery lug.

From the foregoing description considered in connection with the accompanying drawing it will be obvious that I have produced a device that will result in an air-tight perfect contact, reducing to a minimum, the danger of corrosion; that due to the nature of the threaded element 13 which is preferably made of Swedish steel, the said element will readily become magnetized by the electric current passing therethrough from the battery resulting in a dryness in the top of the battery post, and further tending to eliminate corrosion, and that due to the construction of the screw employed and the wedges 21 and 22, a means has been provided for gripping any size of cable, flat or round, thereby eliminating the necessity of soldering the cable to the terminal, although it is readily understood that the cable can be soldered to the terminal, if desired.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, a pair of battery lug engaging castings having a threaded opening formed with one half in each casting and adapted to engage a battery lug, a threaded screw extending through said castings, said screw having a tapered end, said screw when tightened moving said castings toward each other for gripping said battery terminal, one of said castings having a cable engaging means secured thereto, said means including an offset portion provided with a threaded opening in axial alignment with said screw, means for holding said cable in said threaded opening whereby the tapered end of said screw will engage said cable.

WILLIAM RAVER.